Nov. 3, 1925.  1,560,339
A. A. EGLI ET AL
TYPOGRAPHICAL POINT COUNTER
Filed July 25, 1923  2 Sheets-Sheet 1
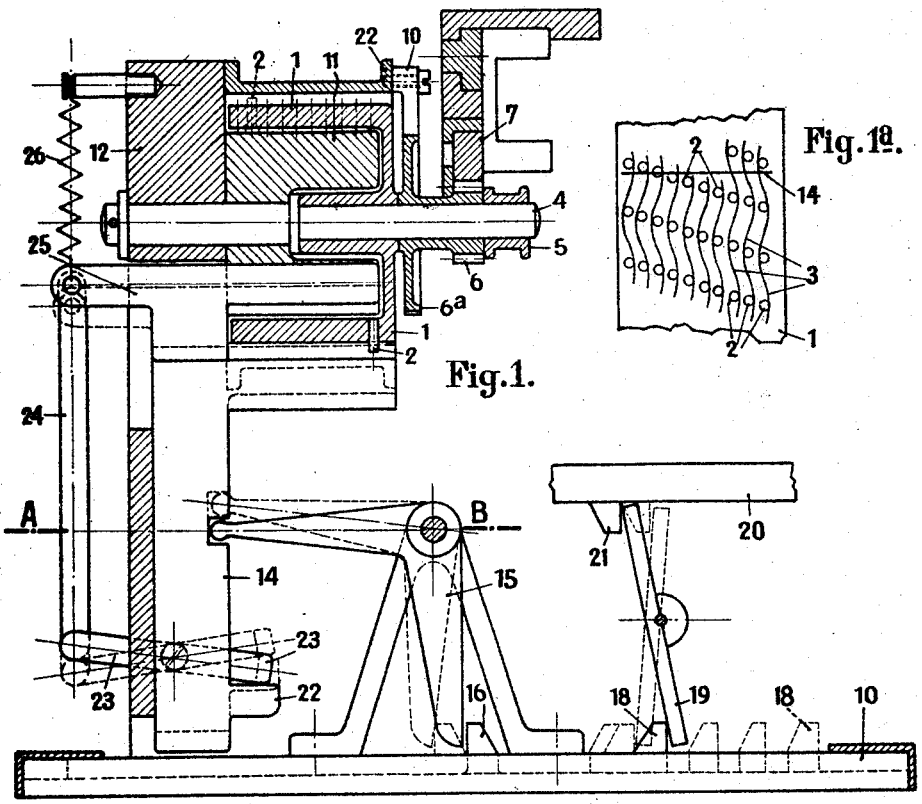
Fig.1.
Fig.1a.
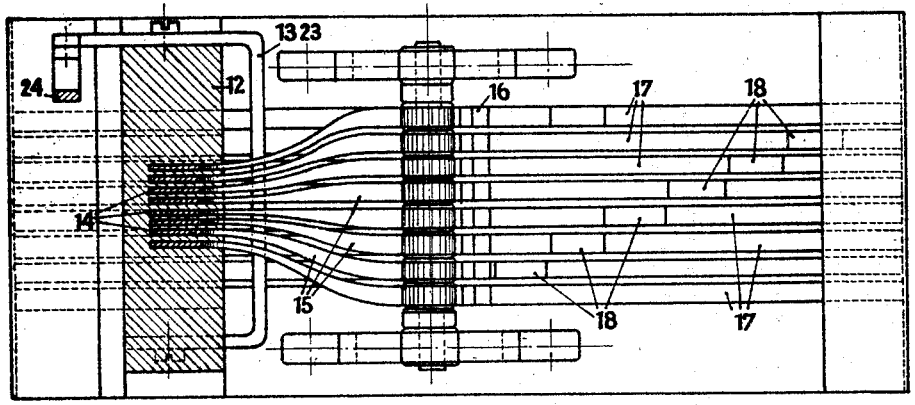
Fig.3.
(A--B)
Inventors
Arnold August Egli, and
Hans Graf
by Knight Bros Attorneys Nov. 3, 1925.　　　　　　　　　　　　　　　　　1,560,339
A. A. EGLI ET AL
TYPOGRAPHICAL POINT COUNTER
Filed July 25, 1923　　　2 Sheets-Sheet 2

Inventors
Arnold August Egli, and
Hans Graf
by Knight Bros.
attorneys

Patented Nov. 3, 1925.

1,560,339

UNITED STATES PATENT OFFICE.

ARNOLD AUGUST EGLI, OF BERN, AND HANS GRAF, OF LAUPEN-BERN, SWITZERLAND, ASSIGNORS TO THE FIRM POLYGRAPHISCHE GESELLSCHAFT, OF LAUPEN-BERN, SWITZERLAND.

TYPOGRAPHICAL-POINT COUNTER.

Application filed July 25, 1923. Serial No. 653,688.

*To all whom it may concern:*

Be it known that we, ARNOLD AUGUST EGLI, a citizen of the Swiss Republic, residing at Bern, Switzerland, and HANS GRAF, a citizen of the Swiss Republic, residing at Laupen-Bern, Switzerland, have invented certain new and useful Improvements in Typographical-Point Counters, of which the following is a specification.

This invention relates in general to machines for positioning types line for line and more particularly to a typographical point counter for such machines. In a machine of the character contemplated by the present invention, the individual letters do not become apparent until after an entire line has been completed by the required operation of the keys corresponding to the several letters constituting said line. For this purpose, the present invention contemplates improved mechanism whereby the widths of the respective types are measured while the line of types is being prepared. The point counter comprises a member which causes a pointer or indicator to execute greater or smaller movements according as the particular type-width registered by means of the point counter is greater or smaller. This member has the form of a movable distance-measuring member or drum provided with arresting members, which latter can be indirectly or directly set for operation, and which travel with the distance-measuring member, through a distance corresponding to their position in the measuring member, until they strike against a fixed stop, and thereby arrest the motion of the distance-measuring member. The arrangement of the point counter is preferably such that whenever an arresting member is set for operation the previously set arresting member is restored to its normal position in the distance measuring member. The distance measuring member is preferably made in the form of a drum which surrounds a stationary cylinder provided with a recess into which the arresting members carried by the drum can be moved. The arresting members are arranged so as to be locked or held by friction in whatever position they are moved. The positions of the arresting member in the drum are such that the angular distance between their centers is as small as possible. The devices for setting the arresting members for operation are preferably made in the form of knife edges actuated from the keys of the typesetting machine or the like.

The invention is shown by way of example in the drawing in which Fig. 1 is a vertical section through the point counter and a side view of the key-operated actuating devices, Fig. 1ª is a development of the distance measuring drum with its arresting members.

Fig. 3 is a section on the line A—B of Fig. 1 and Figs. 4, 5 and 6 are sections through the distance measuring drum with an arresting member shown in different positions and the recessed fixed cylinder inside the drum.

Figure 2:
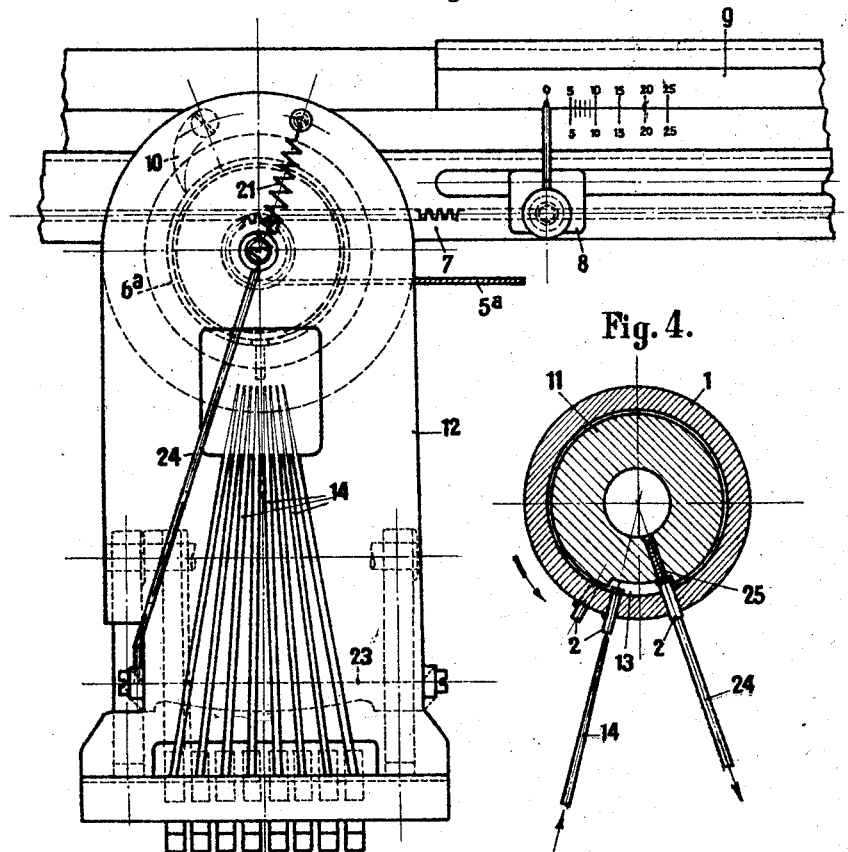
Fig. 2 is a side elevation of the point counter.
Figure 4:
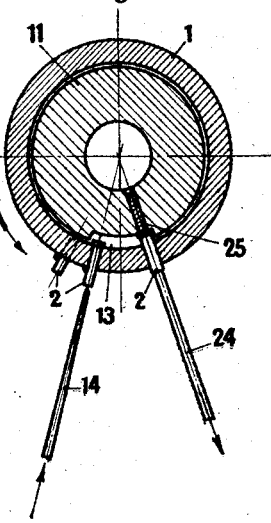
Figure 5:
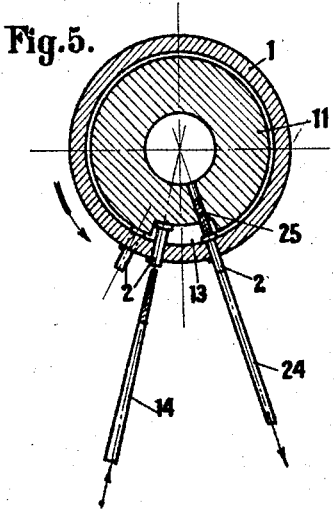
Figure 6:
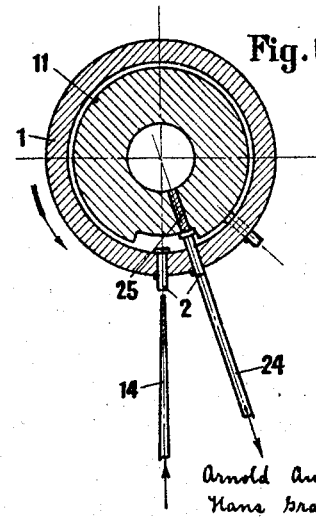

Referring to the drawing 1 is the rotatable distance-measuring member or type-width-measuring drum in which there are arranged a plurality of oblique rows of arresting members or pins 2 (see Fig. 1ª), these pins being displaceable in the drum in the direction of their lengths and being locked or held in whatever position they are longitudinally shifted by friction maintained by means of springs 3 which exert lateral pressure on the pins 2. The drum 1 is mounted on a rotatable shaft 4. A pulley 5, to which a tendency to rotate is imparted by a tensioned cord 5ª or the like, is fixed on the shaft 4. Also keyed to the shaft 4 is a pinion 6 which meshes with a rack 7 that carries a pointer 8. The pointer 8 is adapted to move along a graduated scale 9 so as to indicate the width or point values of the types whose widths are measured by the type-width or distance-measuring drum. Connected with the rack 6 is a ratchet wheel 6ª which cooperates with a pawl 10. The teeth of the ratchet have a very fine pitch. The drum 1 surrounds or encloses a cylindrical stop-carrying member 11 which is fixed to an upright 12. The fixed cylindrical member 11 has a recess 13 at the bottom (see Figs. 4–6) which is located opposite to the knife-edged depressing members 14 which are adapted to push in or depress the arresting members 2. These knife-edged depressing members or arresting-member shifters 14 are arranged to be actuated by bell-crank levers 15 which, in turn, are rocked by projections 16 extending upwardly from longitudinally movable bars 17. These bars 17 are provided with other upwardly extending projections 18 that coöperate with oscillating bars 19 whose upper ends are oscillated by projections 21 extending downwardly from longitudinally displaceable bars 20 actuated by keys (not shown) of the typesetting machine. The knife-edged arresting member shifters 14 are provided with lateral projections 22 (see Fig. 1) adapted to act upon a universal bar 23 connected with a lateral rocker arm which is coupled with a vertically movable drawrod 24. This drawrod 24 is connected at its upper end to a blade-shaped arresting-member restorer 25 which is adapted to push out arresting members 2 that have been pushed inwards into the drum. The interaction between the arresting-member shifters 14 and the arresting-member restorer 24 is such that, as indicated in Figs. 4–6, whenever an arresting member 2 is shifted inwards by a member 14 the previously shifted arresting member 2 is pushed outwards again or restored to its normal position by the restoring member 24. The knife edges of the shifting members 14 are made as sharp as possible so that each edge will act on a single arresting member or pin 2 only as indicated in Fig. 1ª in which the line 14 represents a knife edge. The blade-shaped arresting-member restorer 24 is pulled upward into its normal position after each actuation by a spring 26.

When an arresting member 2, which abuts upon the right hand edge of the recess 13, is moved outward by the restorer 25 the type-width measuring drum is enabled to rotate around the fixed cylinder 11 until the next depressed or inwardly shifted arresting member strikes against the right hand edge of the recess 13. The amount of rotary movement executed by the type width measuring drum 1 depends upon the position of the arresting member 2 last depressed by a member 14. Thus if the arresting member last depressed is the member 2 opposite to the shifter 14, Fig. 6, the amount of rotary movement executed by the drum 1 will be smaller than if the arresting member 2 last shifted is the one which is opposite to the shifter 14 shown in Fig. 4. The rotation of the drum results in rotation of the wheel 6 and in displacement of the rack 7. Backward rotation of the drum is prevented by the pawl or detent 10 that cooperates with the ratchet wheel 6ª.

The projections 18 and hence the horizontal bars 17 and the arresting member shifters 14 actuated are selected by keys. According to the type width or point value of the depressed key which may be power driven the bar 20 moved by the key will have a projection 21 that corresponds to a projection 18 of a certain bar 17.

Claims:

1. In a machine for positioning types line for line, a typographical point counter comprising a movable distance measuring member, a fixed stop, arresting members arranged in the distance measuring member for determining the extent of its movements, means for shifting an arresting member into the range of the said stop and means for moving the measuring member until a shifted arresting member thereof strikes the said stop.

2. In a machine for positioning types line for line, a typographical point counter comprising a movable distance measuring member, a fixed stop, arresting members arranged in the distance measuring member for determining the extent of its movements, means for shifting an arresting member into the range of the said stop and for simultaneously moving another arresting member out of range of the said stop and means for moving the measuring member until a shifted arresting member thereof strikes the said stop.

3. In a machine for positioning types line for line a typographical point counter comprising a rotatable distance measuring drum, a fixed stop, arresting members arranged in the distance measuring drum for determining the extent of its movements, means for shifting an arresting member into the range of the said stop and means for moving the measuring drum until a shifted arresting member thereof strikes the said stop.

4. In a machine for positioning types line for line a typographical point counter comprising a rotatable distance measuring drum, a fixed stop, arresting members arranged in the distance measuring drum for determining the extent of its movements, means for shifting an arresting member into the range of the said stop and for simultaneously moving another arresting member out of the range of the said stop and means for moving the measuring drum until a shifted arresting member thereof strikes the said stop.

5. In a machine for positioning types line for line, a typographical point counter comprising a rotatable distance measuring drum, a cylindrical recessed body within the drum, a stop at an edge of the recess, arresting members arranged in the distance measuring drum for determining the extent of its movements, means for shifting an arresting member into the range of the said stop and means for moving the measuring drum until a shifted arresting member thereof strikes the said stop.

6. In a machine for positioning types line for line, a typographical point counter comprising a rotatable distance measuring drum, a cylindrical recessed body within the drum, a stop at an edge of the recess, arresting members arranged in the distance measuring drum for determining the extent of its movements, means for shifting an arresting member into the range of the said stop and for simultaneously moving another arresting member out of the range of the said stop and means for moving the measuring drum until a shifted arresting member thereof strikes the said stop.

7. In a machine for positioning types line for line, a typographical point counter comprising a movable distance measuring member, a fixed stop, frictionally held movable arresting members arranged in the distance measuring member for determining the extent of its movements, means for shifting an arresting member into the range of the said stop and means for moving the measuring member until a shifted arresting member thereof strikes the said stop.

8. In a machine for positioning types line for line, a typographical point counter comprising a movable distance measuring member, a fixed stop, frictionally held movable arresting members arranged in the distance measuring member for determining the extent of its movements, means for shifting an arresting member into the range of the said stop and for simultaneously moving another frictionally held arresting member out of the range of the said stop and means for moving the measuring member until a shifted arresting member thereof strikes the said stop.

9. In a machine for positioning types line for line, a typographical point counter comprising a rotatable distance measuring drum, a cylindrical recessed body within the drum, a stop at an edge of the recess, movable arresting members with heads arranged in the distance measuring drum for determining the extent of its movements, means for shifting an arresting member into the range of the said stop, means for moving the measuring drum until a shifted arresting member thereof strikes the said stop and a distance between the drum and the cylindrical recessed body for a head of an arresting member.

10. In a machine for positioning types line for line, a typographical point counter comprising a movable distance measuring member, a fixed stop, movable arresting members arranged in the distance measuring member for determining the extent of its movements, said arresting members being adapted to move into the said recess, means for shifting an arresting member into the range of the said stop, a stop carrier with a downwardly directed recess therein and for simultaneously moving another arresting member out of the range of the said stop, and means for moving the measuring member until a shifted arresting member thereof strikes the said stop.

11. In a machine for positioning types line for line, a typographical point counter comprising a movable distance measuring member, a fixed stop, arresting members arranged in oblique rows in the distance measuring member for determining the extent of its movements, means for shifting an arresting member into the range of the said stop, and means for moving the measuring member until a shifted arresting member thereof strikes the said stop.

12. In a machine for positioning types line for line, a typographical point counter comprising a movable distance measuring member, a fixed stop, arresting members arranged in oblique rows in the distance measuring member for determining the extent of its movements, means for shifting an arresting member into the range of the said stop and for simultaneously moving another arresting member out of the range of the said stop and means for moving the measuring member until a shifted arresting member thereof strikes the said stop.

13. In a machine for positioning types line for line, a typographical point counter comprising a rotatable distance measuring drum, a fixed stop, arresting members arranged in oblique rows in the distance measuring drum for determining the extent of its movements, means for shifting an arresting member into the range of the said stop and means for moving the measuring drum until a shifted arresting member thereof strikes the said stop.

14. In a machine for positioning types line for line, a typographical point counter comprising a rotatable distance measuring drum, a fixed stop, arresting members arranged in oblique rows in the distance measuring drum for determining the extent of its movements, means for shifting an arresting member into the range of the said stop and for simultaneously moving another arresting member out of the range of the said stop and means for moving the measuring drum until a shifted arresting member thereof strikes the said stop.

15. In a machine for positioning types line for line, a typographical point counter comprising a movable distance measuring member, a fixed stop, arresting members arranged in oblique rows in the distance measuring member for determining the extent of its movements, movable knives for shifting an arresting member into the range of the said stop and means for moving the measuring member until a shifted arresting member thereof strikes the said stop.

16. In a machine for positioning types line for line, a typographical point counter comprising a movable distance measuring member, a fixed stop, arresting members arranged in oblique rows in the distance measuring member for determining the extent of its movements, movable knives for shifting an arresting member into the range of the said stop, means for simultaneously moving another arresting member out of the range of the said stop, and means for moving the measuring member until a shifted arresting member thereof strikes the said stop.

17. In a machine for positioning types line for line, a typographical point counter comprising a rotatable distance measuring drum, a fixed stop, arresting members arranged in the distance measuring drum for determining the extent of its movements, movable converging knives for shifting an arresting member into the range of the said stop and means for moving the measuring drum until a shifted arresting member thereof strikes the said stop.

18. In a machine for positioning types line for line, a typographical point counter comprising a rotatable distance measuring drum, a fixed stop, arresting members arranged in the distance measuring drum for determining the extent of its movements, movable converging knives for shifting an arresting member into the range of the said stop, means for simultaneously moving another arresting member out of the range of the said stop, and means for moving the measuring drum until a shifted arresting member thereof strikes the said stop.

19. In a machine for positioning types line for line, a typographical point counter comprising a movable distance measuring member, a fixed stop, arresting members arranged in the distance measuring member for determining the extent of its movements, devices for shifting an arresting member, into the range of the said stop, a restorer for moving another arresting member out of the range of the said stop, a device for transferring motion from the shifting devices to the said restorer, and means for moving the measuring member until a shifted arresting member thereof strikes the said stop.

20. In a machine for positioning types line for line, a typographical point counter comprising a movable distance measuring member, a fixed stop, arresting members arranged in the distance measuring member for determining the extent of its movements, means for shifting an arresting member into the range of the said stop and for simultaneously moving another arresting member out of the range of the said stop, means for moving the measuring member until a shifted arresting member thereof strikes the said stop and key-actuated means for operating the said shifting means.

21. A point counter comprising a graduated scale, a pointer cooperating with the scale, a rotatable drum adapted to move the said pointer, a recessed body within the drum, drum-arresting members arranged in oblique rows in the drum and adapted to co-operate with an edge of the recess, members at different points of the periphery of the drum for shifting the arresting members into the said recess, a restoring member at the arresting edge of the said recess for shifting the moved arresting member into its normal position and key-actuated members for operating the said shifting and restoring members.

22. A point counter comprising a graduated scale, a pointer cooperating with the scale, a rotatable drum adapted to move the said pointer, a recessed body within the drum, drum-arresting members arranged in oblique rows in the drum and adapted to cooperate with an edge of the recess, members at different points of the periphery of the drum for shifting the arresting members into the said recess, a restoring member at the arresting edge of the said recess for shifting the moved arresting member into its normal position and key-actuated power driven members for operating the said shifting and restoring members.

23. In a machine for positioning types line for line, a typographical point counter comprising a movable distance measuring member, a fixed stop, arresting members arranged in oblique rows in the distance measuring member for determining the extent of its movements, means for shifting an arresting member into the range of the said stop and means for moving the measuring member until a shifted arresting member thereof strikes the said stop.

24. In a machine for positioning types line for line, a typographical point counter comprising a movable distance measuring member, a fixed stop, arresting members arranged in oblique rows in the distance measuring member for determining the extent of its movements, means for shifting an arresting member into the range of the said stop and for simultaneously moving another arresting member out of the range of the said stop, and means for moving the measuring member until a shifted arresting member thereof strikes the said stop.

In testimony whereof we have affixed our signatures.

ARNOLD AUGUST EGLI.
HANS GRAF.